UNITED STATES PATENT OFFICE.

MARTIN KALBFLEISCH, OF BUSHWICK, NEW YORK.

IMPROVEMENT IN THE MANUFACTURE OF PRUSSIATES OF POTASH AND SODA.

Specification forming part of Letters Patent No. 5,419, dated January 25, 1848.

*To all whom it may concern:*

Be it known that I, MARTIN KALBFLEISCH, in the town of Bushwick, county of Kings, and State of New York, have invented a new and Improved Mode of Treating Animal Matters Previous to Calcination for the Manufacture of Prussiates of Potash or Soda; and I do hereby declare that the following is a full and exact description.

The nature of the invention consists in dissolving animal matters of any kind in caustic potash or soda, and drying the same before exposing them to a strong heat or calcination.

To enable others skilled in the art to make and use my invention, I will proceed to describe it.

Into a kettle or other convenient vessel introduce a quantity of caustic potash or soda, and add water more than sufficient to dissolve the same. Raise the temperature to boiling-heat, and when hot add animal matters until they cease to be taken up or dissolved by the alkaline solution, which will ordinarily be about one and one-half times the weight of the potash employed. The mass is now dried in the kettle or vessel used, or taken out on shallow pans to dry the same, and so as to allow the operator greater facility to stir it, thereby rendering it fit for calcination in retorts or other convenient vessels.

What I claim as my invention, and desire to secure by Letters Patent, is—

The dissolving the animal matters in caustic potash or soda, thereby rendering the union of the materials more intimate and perfect than by any other known mode or any now in use.

MARTIN KALBFLEISCH.

Witnesses:
HENRY B. GEE,
W. H. GREISCHARD.